US010530271B2

(12) United States Patent
Nakahara et al.

(10) Patent No.: US 10,530,271 B2
(45) Date of Patent: Jan. 7, 2020

(54) POWER CONVERSION DEVICE AND POWER CONVERSION SYSTEM (71) Applicant: Hitachi, Ltd., Chiyoda-ku, Tokyo (JP)

(72) Inventors: Mizuki Nakahara, Tokyo (JP); Yasuaki Norimatsu, Tokyo (JP); Takae Shimada, Tokyo (JP); Mitsuhiro Kadota, Tokyo (JP); Yuki Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/309,335

(22) PCT Filed: Apr. 10, 2017

(86) PCT No.: PCT/JP2017/014623
§ 371 (c)(1),
(2) Date: Dec. 12, 2018

(87) PCT Pub. No.: WO2018/025449
PCT Pub. Date: Feb. 8, 2018

(65) Prior Publication Data
US 2019/0319548 A1 Oct. 17, 2019

(30) Foreign Application Priority Data
Aug. 4, 2016 (JP) .................................. 2016-153317

(51) Int. Cl.
*H02M 7/49* (2007.01)
*H02J 3/38* (2006.01)
(Continued)

(52) U.S. Cl.
CPC ............... *H02M 7/49* (2013.01); *H02J 3/383* (2013.01); *H02M 3/1584* (2013.01); *H02M 7/10* (2013.01);
(Continued)

(58) Field of Classification Search
CPC ........ H02M 7/49; H02M 7/7575; H02M 7/25; H02M 7/10; H02M 3/1584; H02M 2007/4835; H02M 2001/007; H02J 3/383
See application file for complete search history.

(56) References Cited

U.S. PATENT DOCUMENTS

2012/0112545 A1 5/2012 Aiello et al.
2013/0187473 A1* 7/2013 Deboy .................... H02M 7/49
307/82

(Continued)

FOREIGN PATENT DOCUMENTS

JP 2004-64830 A 2/2004
JP 2007-37290 A 2/2007
(Continued)

OTHER PUBLICATIONS

International Search Report (PCT/ISA/210) issued in PCT Application No. PCT/JP2017/014623 dated May 16, 2017 with English translation (four (4) pages).
(Continued)

*Primary Examiner* — Kyle J Moody
(74) *Attorney, Agent, or Firm* — Crowell & Moring LLP (57) ABSTRACT In a power conversion device in a configuration in which a plurality of power converter cells has serially connected outputs and includes a converter and an inverter as components, when a load is light, the cells also operate with a light load, and efficiency is reduced. A power conversion device has a plurality of power converter cells. The outputs of the cells are connected in series. The device has a controller that controls the cells. The cells each have a converter that converts an externally inputted power supply voltage and generates a DC link voltage and an inverter that converts the DC link voltage into an alternating current voltage and outputs the current. The controller stops a converter in some of the cells depending on power supply electric power or
(Continued)

load electric power. The inverter continues to operate using a link capacitor as a power supply.

11 Claims, 9 Drawing Sheets

(51) Int. Cl.
  *H02M 3/158* (2006.01)
  *H02M 7/10* (2006.01)
  *H02M 7/25* (2006.01)
  *H02M 7/757* (2006.01)
  *H02M 1/00* (2006.01)
  *H02M 7/483* (2007.01)
(52) U.S. Cl.
  CPC ........... *H02M 7/25* (2013.01); *H02M 7/7575* (2013.01); *H02M 2001/007* (2013.01); *H02M 2007/4835* (2013.01)

(56) References Cited

U.S. PATENT DOCUMENTS

2016/0336873 A1*  11/2016  Ayai .................. H02M 3/33576
2017/0133921 A1*  5/2017  Okumura .................. G05F 1/67

FOREIGN PATENT DOCUMENTS

JP    2010-166654 A    7/2010
JP    2013-541934 A    11/2013

OTHER PUBLICATIONS

Japanese-language Written Opinion (PCT/ISA/237) issued in PCT Application No. PCT/JP2017/014623 dated May 16, 2017 (four (4) pages).

* cited by examiner

POWER CONVERSION DEVICE AND POWER CONVERSION SYSTEM

TECHNICAL FIELD

The present invention relates to a power conversion device and a power conversion system.

BACKGROUND ART

Power conversion devices are designed such that the devices operate highly efficiently at the rated load. The devices are generally prone to suffer a reduction in efficiency with a light load. Therefore, in order to improve the efficiency of a power conversion device including pluralities of converters and inverters in a light load mode, there is a technique described in Japanese Unexamined Patent Application Publication No. 2010-166654 (PTL 1). In PTL 1, the load factor of entire inverter/converter modules having outputs connected in parallel with each other is monitored, and the number of inverter/converter modules assigned to run is determined, intending to improve efficiency in the light load mode.

CITATION LIST

Patent Literature

PTL 1: Japanese Unexamined Patent Application Publication No. 2010-166654

SUMMARY OF INVENTION

Technical Problem

Since PTL 1 has a premise that is a configuration in which a plurality of power conversion devices has outputs connected in parallel with each other, PTL 1 gives no consideration to a configuration in which outputs are connected in series. Suppose that the configuration described in PTL 1 is adapted to a configuration in which outputs are connected in series, a given converter/inverter module is stopped, and thus no output is obtained.

Therefore, in the present invention, an object is to provide a technique with which in a configuration in which a plurality of power converter cells including a converter and an inverter as components has outputs connected in series, the efficiency of the power converter cells and a power conversion device in a light load mode is improved.

Solution to Problem

A power conversion device according to the present invention has a plurality of power converter cells. The outputs of the power converter cells are connected in series. The device includes a controller that controls the cells. The cells each have a converter that converts an externally inputted power supply voltage and generates a DC link voltage, and an inverter that converts the DC link voltage into an alternating current voltage and outputs the current. The controller stops a converter in some of the cells depending on power supply electric power or load electric power. The inverter continues to operate using a DC link capacitor as a power supply.

Advantageous Effects of Invention

According to the present invention, in a configuration in which a plurality of cells including a converter and an inverter as components has outputs connected in series, efficiency in a light load mode is improved.

DESCRIPTION OF EMBODIMENTS

In the following, examples will be described with reference to the drawings.

EXAMPLE 1

Figure 1:
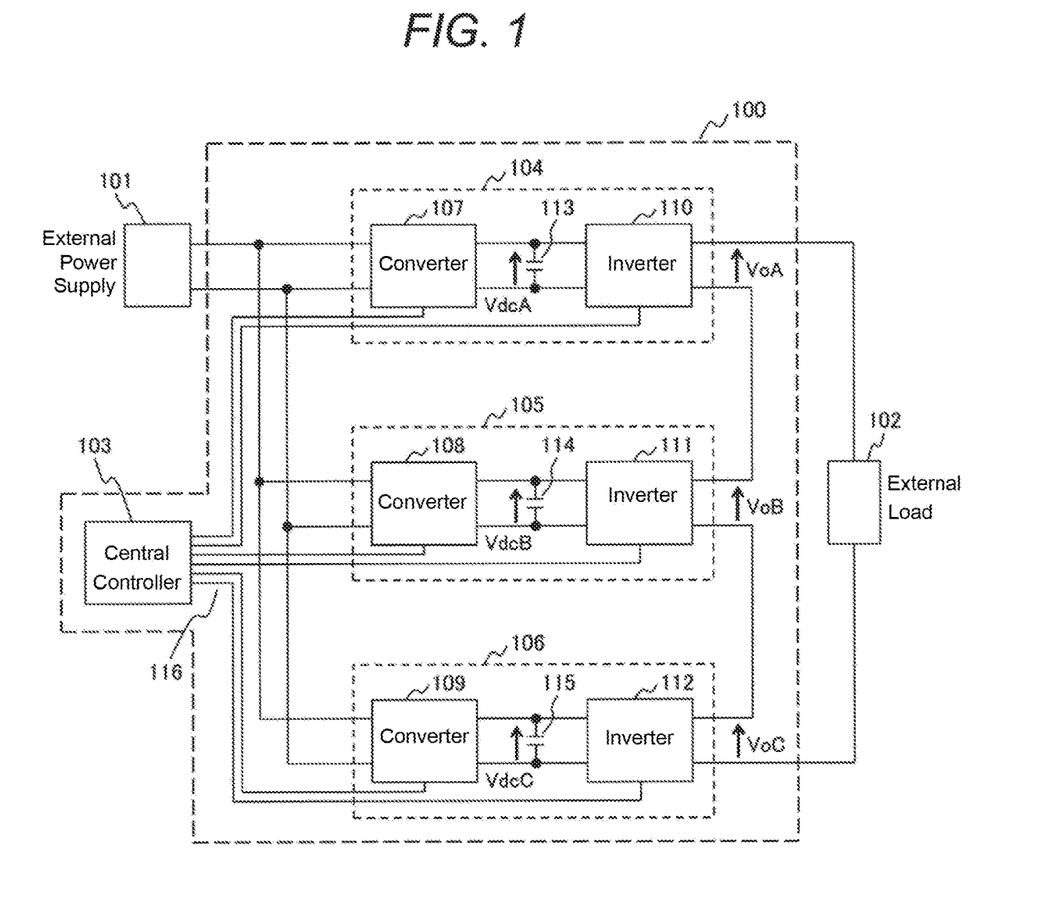
FIG. 1 is a block diagram of a power conversion device in which a plurality of cells including a converter and an inverter as components has outputs connected in series.

FIG. 1 is the configuration of a power conversion device 100 in the example.

A power conversion device 100 converts electric power inputted from an external power supply 101, and outputs the power to an external load 102. The power conversion device 100 includes three power converter cells 104 to 106 having a converter and an inverter as components and includes a central controller 103. The power converter cells 104 to 106 respectively include converters 107 to 109 that convert a power supply voltage from the power supply and generate DC link voltages (VdcA to VdcC) and inverters 110 to 112 that convert the DC link voltages into alternating current voltages (VoA to VoC). Note that the power conversion device 100 also includes a converter controller that controls the converters and an inverter controller that controls the inverters, both not shown. In the cells, DC link capacitors 113 to 115 are respectively connected to the output side direct current parts of the converters 107 to 109 and the input side direct current parts of the inverters 110 to 112 in parallel with each other. The central controller 103 is connected to the power converter cells through communication lines 116, and controls the running of the converters and the inverters. The central controller 103 may communicate with the power converter cells in a wireless manner. In FIG. 1, an example is shown in which the power converter cells are connected in parallel with each other to the power supply 101. However, the power converter cells may be connected in series to the power supply 101. Power supplies may be independently connected to the power converter cells.

Three cells, the power converter cells 104 to 106, are connected in parallel with each other to the power supply 101. That is, three converters, the converters 107 to 109 constituting the power converter cells, are connected in parallel with each other. On the other hand, the outputs of the cells are connected in series, and the outputs form the output of the power conversion device 100.

The configuration in FIG. 1 has three power converter cells. This shows one form according to the present invention. The number of power converter cells is non-limiting.

Figure 2:
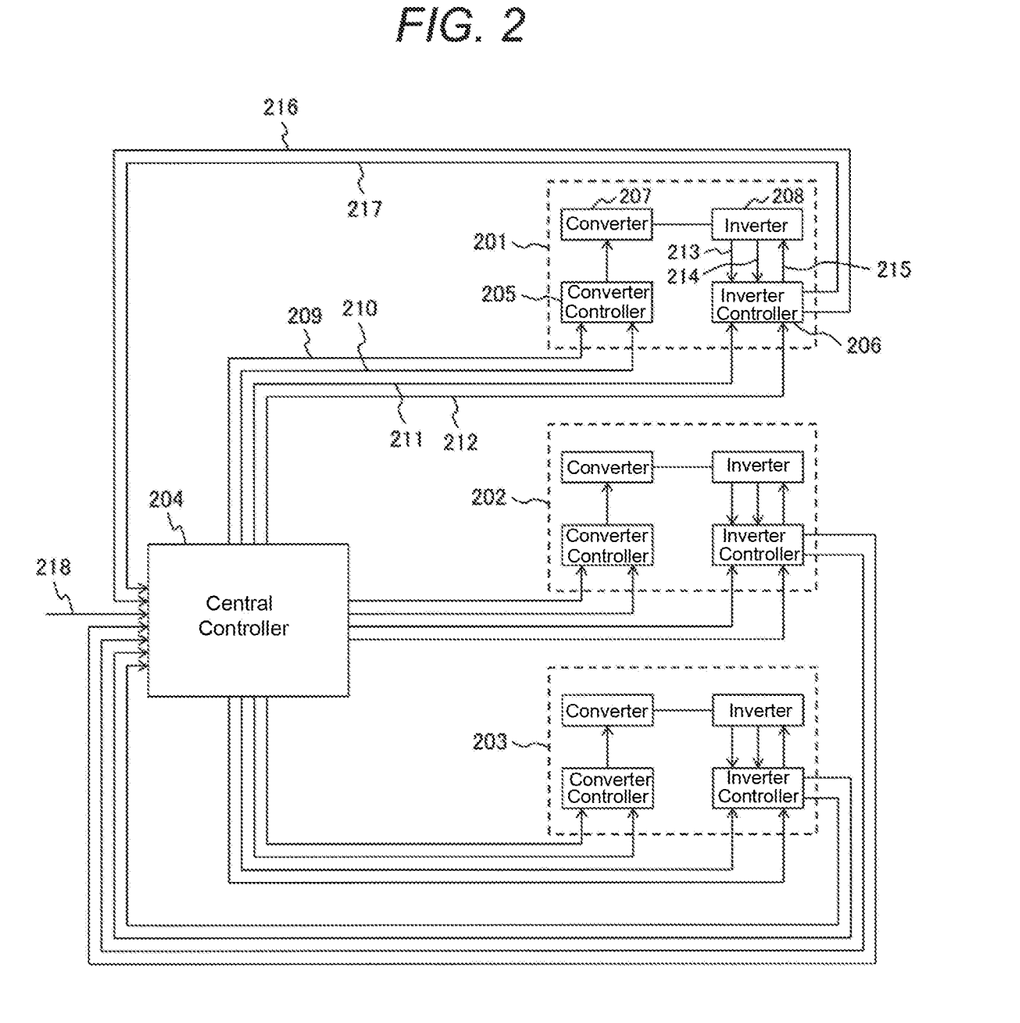
FIG. 2 is a functional block diagram showing the configuration of a system to which the present invention is adapted.

FIG. 2 is a functional block diagram showing the configuration of a system in the example.

This system has power converter cells 201 to 203 and a central controller 204 connected to the power converter cells 201 to 203 through signal lines. FIG. 2 shows the case in which the system is mounted with three power converter cells having a converter and an inverter as components. In the following description, the system will be described as the power converter cell 201 is taken as an example. The other power converter cells 202 and 203 also have the similar configurations, and the description is omitted. The system has the central controller 204 that transmits a DC link voltage command value 209 and a converter run command 210 to a converter controller 205 and transmits an output power command value 211 and an inverter run command 212 to an inverter controller 206. In order to generate the commands, the inverter controller 206 first obtains a DC link voltage 213 and output electric power 214 from an inverter 208. Subsequently, the inverter controller 206 transmits a DC link voltage 216 and output electric power 217 to the central controller 204, and the central controller 204 externally receives an input of data of a converter efficiency curve 218. Here, the term "efficiency curve" means such a curve illustrated in FIG. 5, for example. The detail of FIG. 5 will be described later.

The converter controller 205 and the inverter controller 206 generate gate signals based on the commands generated at the central controller 204, and respectively drive a converter 207 and the inverter 208. For example, in the case in which the converter 207 is stopped in accordance with a cell drop operation, the detail of which will be described later, the central controller 204 transmits a stop signal as the converter run command 210 to the converter controller 205. The central controller 204 also controls the power converter cell 202 and 203 similarly to the power converter 201 described above. FIG. 2 shows the case in which three power converter cells are provided, which is an example, and the number of the cells is not limiting.

In the following, the operation (the cell drop operation) in the example will be described. First, the load electric power (output electric power) obtained at the central controller 204 is compared with a given threshold (predetermined electric power). As a result of comparison, in the case in which the load electric power is below the threshold, the operation goes to a cell drop operation mode. In the case in which the load electric power is not below the threshold, the normal operation is continued.

After the operation goes to the cell drop operation mode, the central controller 204 first determines the number of the converters assigned to run based on the data of the converter efficiency curve 218, described later in FIG. 5, such that the entire power conversion device 100 achieves the maximum efficiency. Subsequently, based on the number of the converters assigned to run determined at the central controller 204, the central controller 204 selects a power converter cell whose converter is to be stopped or a power converter cell whose converter is continued to run. These power converter cells are selected according to the DC link voltages (VdcA to VdcC) of the power converter cells or the temperature status of the power converter cells, for example. For example, a method is considered with which a selection is made in priority to a power converter cell that sufficiently has a DC link voltage and has its temperature higher than the temperatures of the other power converter cells. This configuration enables achieving a highly reliable, highly efficient power conversion device. Note that such a method may be possible with which power converter cells whose converter is to be stopped are ordered in advance and are selected in rotation. This configuration enables achieving the highly efficient power conversion device while the central controller 204 has a relatively small arithmetic operation load. Upon selecting a power converter cell whose converter is to be stopped, the central controller 204 transmits a stop signal to the power converter cell whose converter is to be stopped, and stops the converter. During this stop, the inverter in the power converter cell whose converter is stopped keeps outputting electric power using a DC link capacitor as a power supply. Since the DC link capacitor has no electric power supply from the converter, the DC link voltage drops with a lapse of time. In the case in which the DC link voltage drops to a predetermined value, the central controller 204 transmits an operation signal to the power converter cell whose converter is stopped, and operates the converter to supply electric power to the load and to charge the DC link capacitor. In charging the DC link capacitor, the capacitor is charged at electric power at which the converter operates at the maximum efficiency. Subsequently, the central controller 204 selects a power converter cell whose converter is to be stopped by a method similar to the method described above, and stops the converter in the selected power converter cell. Since the configuration is provided, the supply of output electric power can be continued even during the cell drop operation, and hence achieving the highly efficient power conversion device 100 is enabled with no influence on the load.

Figure 3:
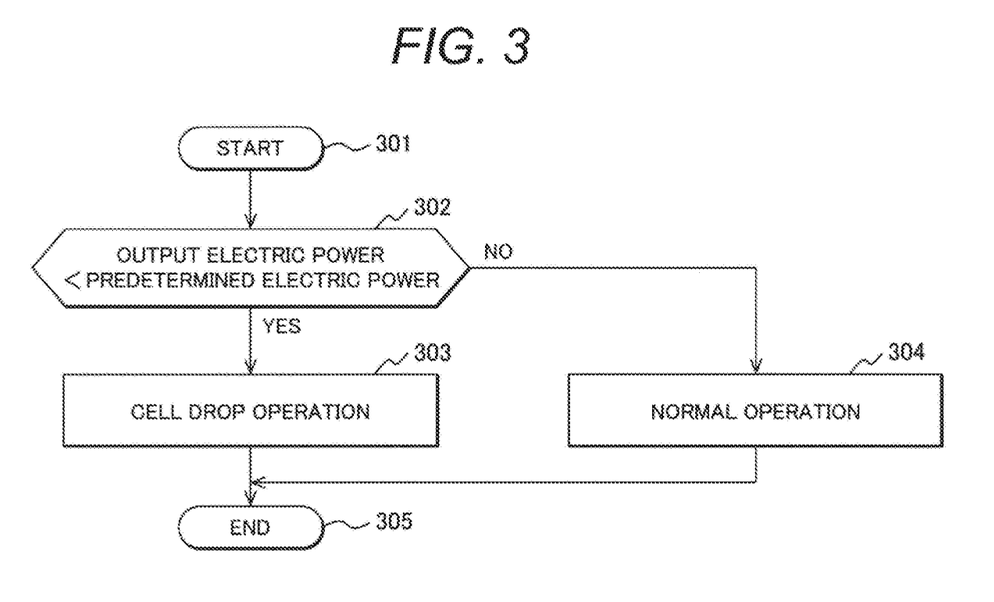
FIG. 3 is a flowchart showing an embodiment of process procedures in the case in which the present invention is adapted.
Figure 4:
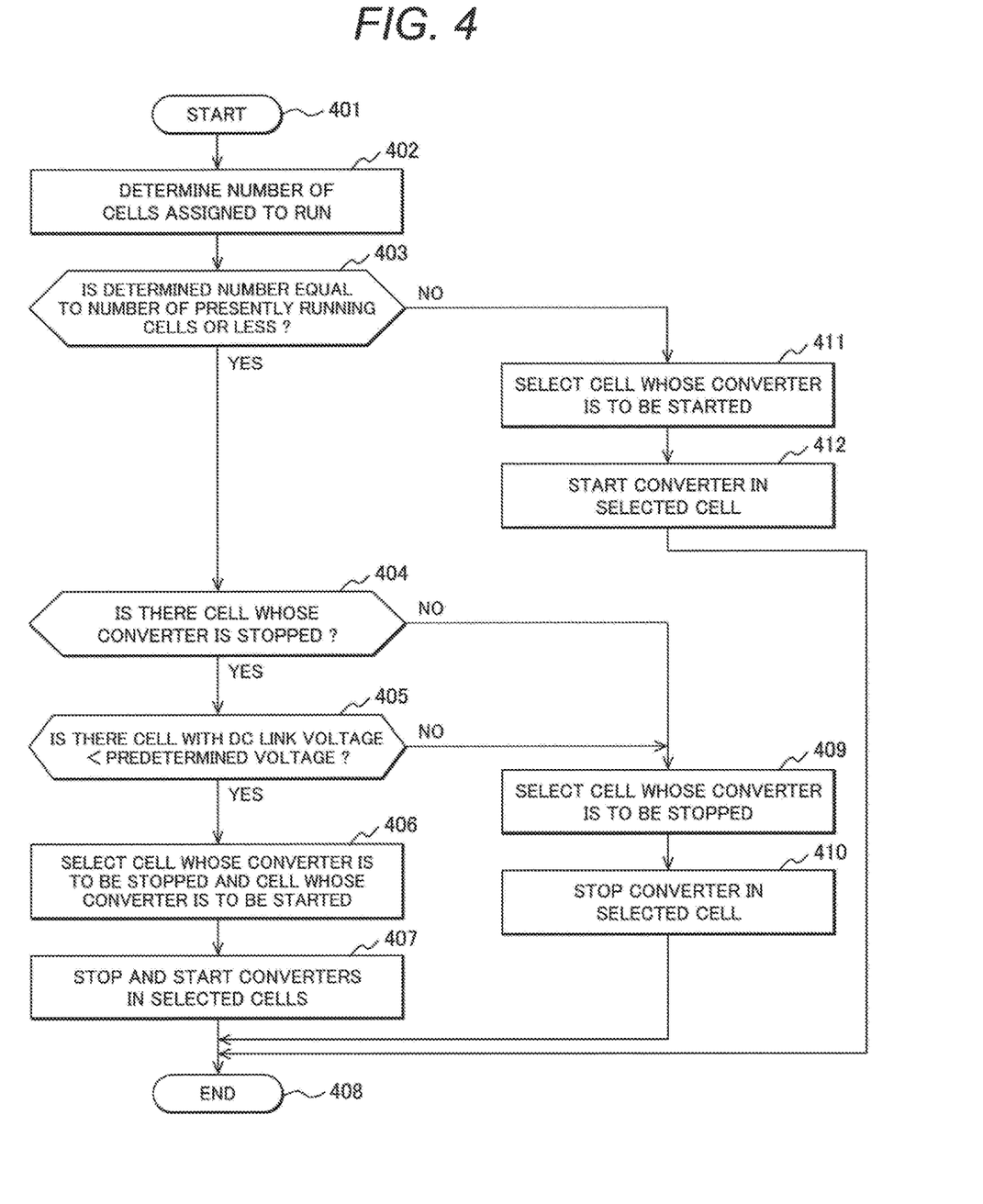
FIG. 4 is a flowchart showing an embodiment of detailed process procedures of a cell drop operation proposed in the present invention.

FIGS. 3 and 4 are flowcharts showing embodiments of process procedures in the case in which the present invention is adapted.

FIG. 3 shows an example of determination process procedures whether to perform the normal operation or the cell drop operation. FIG. 4 shows an example of detailed process procedures of the cell drop operation.

The operation based on the flowchart in FIG. 3 is as follows.

At the central controller 204 that controls the power conversion device 100, the controller 204 determines whether to perform the normal operation or the cell drop operation, and begins control based on the result (Step 301).

First, the central controller 204 compares the value of the output electric power inputted to the central controller 204 with predetermined electric power that is set or calculated, and determines whether the output electric power is less than the predetermined electric power. The predetermined electric power is determined according to the efficiency curve shown in FIG. 5 and the number of power converter cells that are presently running. For example, in the case in which N power converter cells are presently running, the efficiency per power converter cell shown in FIG. 5 is N times electric power that is dropped (Step 302).

When the determination is YES in Step 302, the cell drop operation is performed (Step 303).

When the determination is NO in Step 302, the normal operation is performed. Here, the term "the normal operation" means that the converters and the inverters in all the power converter cells are operating (Step 304).

After Step 303 or Step 304 is performed, the series of processes is ended (Step 305).

Next, FIG. 4 shows an example of detailed process procedures of the cell drop operation (Step 303).

The central controller 204 begins the cell drop operation (Step 401).

First, the central controller 204 determines the number of power converter cells assigned to run whose converters are to run depending on output electric power (load electric power) (Step 402).

Here, the central controller 204 determines whether the number of power converter cells whose converters are presently running is equal to or less than the number of cells assigned to run (Step 403).

When the determination is YES in Step 403, the central controller 204 determines the presence or absence of a power converter cell whose converter is stopped (Step 404). On the other hand, in the case in which the determined number of cells is larger than the number of power converter cells whose converters are presently running (NO in Step 403), the central controller 204 selects the number of power converter cells whose converter is to be started in order to satisfy the number of cells assigned to run determined in Step 402 (Step 411), starts the converters in the selected power converter cells (Step 412), and then ends the series of processes (Step 408).

When the determination is YES in Step 404, the central controller 204 determines the presence or absence of a power converter cell having the DC link voltage that is less than a predetermined voltage in the power converter cells whose converter is stopped (Step 405). When the determination is YES in Step 405, the central controller 204 selects a power converter cell whose converter is to be stopped and a power converter cell whose converter is to be started. Here, the selection of the power converter cell whose converter is to be stopped is determined in accordance with a method, for example, with which selection is made in priority to a power converter cell having a sufficient DC link voltage and having the temperature higher than the temperatures of the other power converter cells as described above (Step 406).

Subsequently, the central controller 204 stops and starts the converters in the selected power converter cells (Step 407).

Until the procedures up to Step 407, the series of processes is ended by the procedures (Step 408).

On the other hand, when the determination is NO in Step 404, the central controller 204 selects a power converter cell whose converter is to be stopped (Step 409).

Subsequently, the central controller 204 stops the converter in the selected power converter cell (Step 410), and ends the process (Step 408).

On the other hand, when the determination is NO in Step 405, the central controller 204 selects a power converter cell whose converter is to be stopped or a power converter cell whose converter is to be started (Step 409), and executes Step 410.

In the process procedures above, the number of cells assigned to run is determined in Step 402, and then determinations in Step 403 and later are made. However, a method may be possible with which the number of cells whose converter is to be stopped is determined in Step 402 and then similar determinations are made in Step 403 and later.

Figure 5:
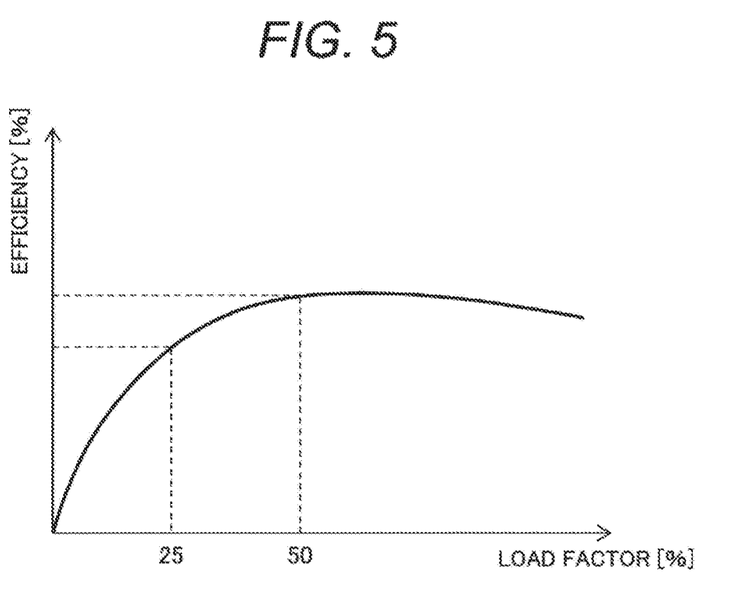
FIG. 5 is a diagram showing an exemplary efficiency curve of a converter.

FIG. 5 is a diagram showing an exemplary efficiency curve of the converter.

The horizontal axis expresses the load factor, and the vertical axis expresses the efficiency of the converter. In this efficiency curve, the efficiency is reduced after the load factor is below 50%. Therefore, the cell drop operation described so far to FIG. 4 is performed, and hence the load factor of the operating converter is increased, enabling highly efficient operation. Regarding the converter that is stopped, fixed losses, such as switching losses and transformer iron losses, can be eliminated, contributing to achieving the highly efficient power conversion device 100. In the cell drop operation described so far to FIG. 4, the converter is again started to run in order to charge the DC link capacitor of the power converter cell whose converter is stopped. In the charging, the converter is operated at electric power at which the maximum efficiency is achieved based on the efficiency curve.

Figure 6:
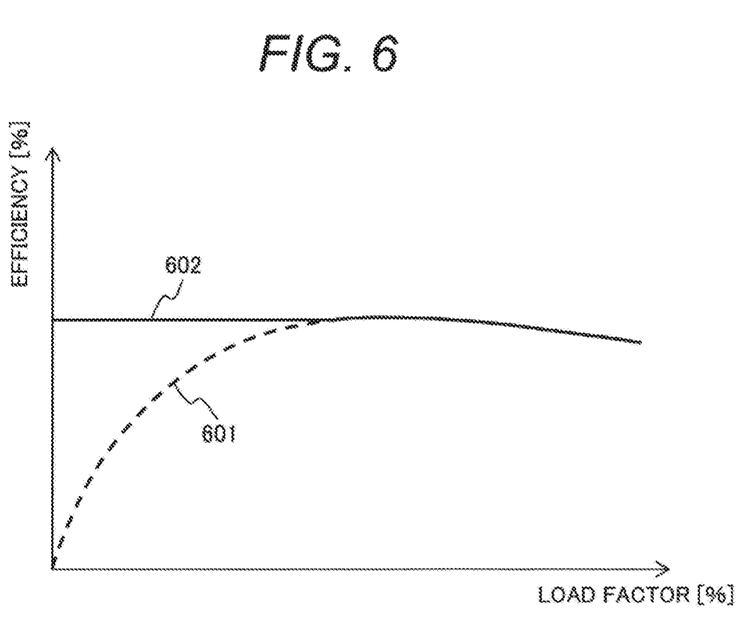
FIG. 6 is a diagram showing an exemplary efficiency curve of all the converters of the power conversion device in the case in which the present invention is adapted.

FIG. 6 is a diagram showing an exemplary efficiency curve of all the converters in the power conversion device 100 in the case in which the example is adapted.

A broken line 601 is an efficiency curve in the case in which the cell drop operation proposed in the present invention is not performed and electric power is equally distributed to all the power converter cells. In this case, it is revealed that the efficiency curve is equal to the efficiency of the converter shown in FIG. 5 and the efficiency is reduced in the light load mode. On the other hand, a solid line 602 expresses an exemplary efficiency curve in the case in which the cell drop operation proposed in the present invention is adapted. The number of power converter cells whose converter operates in the light load mode is controlled to increase electric power per power converter cell, setting a load factor with excellent efficiency. Therefore, the efficiency of the power conversion device 100 in the light load mode is higher than the efficiency of the broken line 601.

Figure 7:
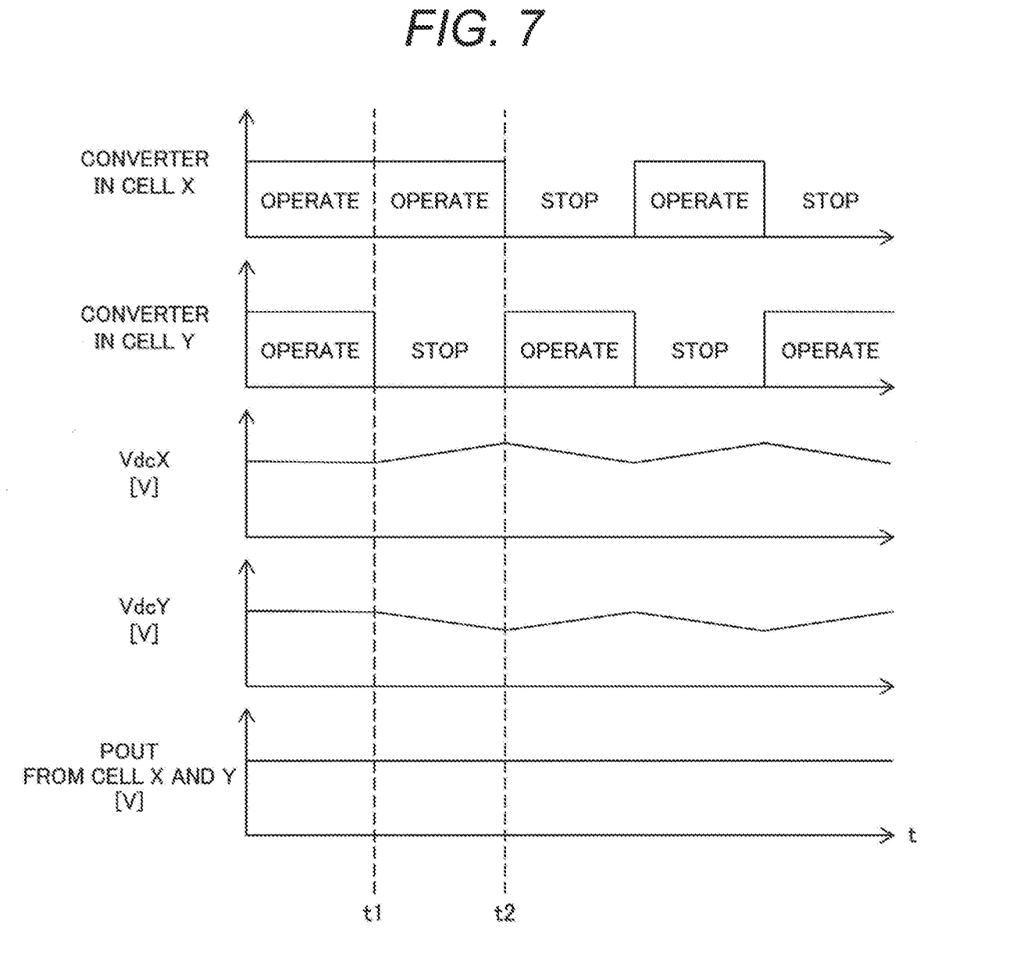
FIG. 7 is a diagram showing an example of the transition of operation status where a half of N cells are to be stopped in the case in which the present invention is adapted.

FIG. 7 is a diagram showing an example of the transition of operation status where about a half of N power converter cells are to be stopped in the case in which the present invention is adapted. Here, N converters are grouped into a group X and a group Y for convenience, and the operation of groups X and Y in a time series, the DC link voltage, and the output electric power are shown in a time series. For example, the groups X and Y have the same number of converters, N/2 converters. In FIG. 7, the same numbers of converters are denoted by groups X and Y. However, the number of converters may be a given number.

After the cell drop operation is started at time t1, the operation of the converter group Y is stopped. At this time, the inverters connected to the converter group Y whose operation has been stopped keep operating using electric power supplied from the DC link capacitors. With a lapse of time, a DC link voltage VdcY of the converter group Y is gradually dropped. At this time, in order to reserve the voltage at the outputs connected in series, a DC link voltage VdcX of the power converter cell X whose converter is operating is temporarily increased. That is, the control of the DC link voltage compensates a drop of the voltage VdcY due to stopping the converters, and the output voltage is maintained. For example, a method is considered with which from the numbers of power converter cells whose converter is operating or stopped, the amount of compensation for a voltage rise and a voltage drop of the power converter cell whose converter is stopped is equally allocated to the power converter cells whose converter is operating for determination. After the DC link voltage Vdcx of the converter group X reaches a predetermined voltage that is determined by the withstand voltage, for example, of the DC link capacitor at time t2, the operation of the converter group Y is again started to charge the DC link capacitors in the converter group Y. A method may be possible with which after the DC link voltage VdcY of the group Y is dropped to a predetermined voltage, the operation of the converter group Y is again started. In charging the capacitors, the converters operate so as to achieve the maximum efficiency. In this charging, the operation of the converter group X is stopped, and the similar operation is performed. From the operation described above, desired electric power can be obtained for a total electric power value Pout from cells X and Y of the converter groups X and Y.

Figure 8:
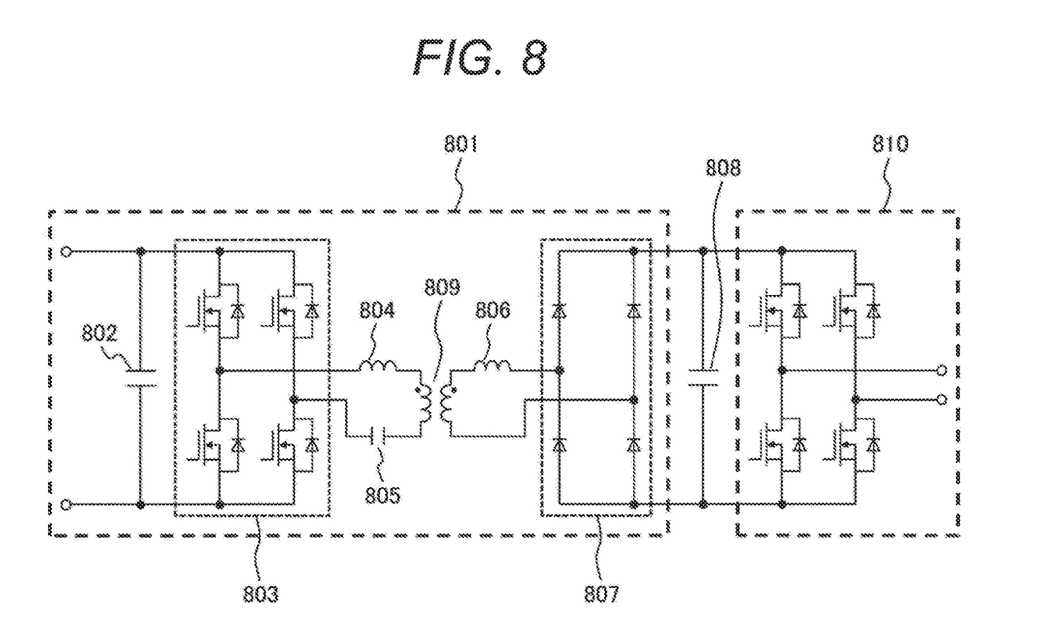
FIG. 8 is a diagram showing an exemplary configuration of components in the inside of a cell according to the present invention.

FIG. 8 shows components that constitute the power converter cell.

A converter 801 includes an input capacitor 802, a full bridge unit 803, a first resonance inductor 804, a resonance capacitor 805, a second resonance inductor 806, and a diode bridge unit 807. To the converter 801, a DC link capacitor 808 is connected through a transformer 809.

A direct current voltage outputted from a direct current power supply is converted into a high frequency alternating current voltage at the full bridge unit 803, and electric power is supplied to the secondary side of the transformer 809 through the transformer 809. The high frequency alternating current voltage induced on the secondary side of the transformer 809 is converted into a direct current voltage at the diode bridge unit 807. The converted direct current voltage is smoothed at the DC link capacitor 808, and electric power is supplied to the inverter 810 connected to the subsequent stage. The electric current outputted from the full bridge unit 803 causes resonance by the first resonance inductor 804, the second resonance inductor 806, and the resonance capacitor 805. The switching devices used in the full bridge unit 803 can perform zero voltage switching by this electric current resonance, contributing to improving the efficiency of the converter 801. Note that regarding the present invention, the switching devices used in the converter 801 in FIG. 8 are MOSFETs for convenience. However, other devices, such as IGBTs, may be used. The diode bridge unit 807 may be a full bridge unit using switching devices. A configuration may be possible in which electric power conversion is performed without using the resonance capacitor 805 with no resonance. A configuration may be possible in which a half bridge unit is used instead of the full bridge unit.

The inverter 810 is composed of a full bridge unit, and the input side of the inverter 810 is connected to the converter 801 through the DC link capacitor 808. The direct current power supplied from the converter 801 is converted into an alternating current at the inverter 810 to supply electric power to a load. During the cell drop operation, no electric power is supplied from the converter 801, and electric power is supplied from the DC link capacitor 808. Regarding the present invention, other switching devices, such as IGBTs, may be used for the switching devices used in the inverter 810. A configuration may be possible in which a half bridge unit is used instead of the full bridge unit.

EXAMPLE 2

This example uses a solar panel instead of the power supply in Example 1, showing the case in which a power conversion device 100 is used as a power conditioner. In the case in which the power supply is a solar panel, electric power to be outputted is greatly varied depending on weathers or hours. Specifically at dawn or nightfall, electric power outputted from the solar panel becomes small, and this might cause a considerable decrease in power generation efficiency due to the fixed loss of the power conversion device 100, for example. Therefore, adapting the cell drop operation according to the present invention enables the improvement of the efficiency of the power conversion device 100 when the solar panel outputs low power, and the improvement of power generation efficiency is enabled.

EXAMPLE 3

This example is additionally provided with a function that charges the DC link capacitor of a power converter cell whose converter is stopped by another other power converter cell, instead of the method with which the converter in some of power converter cells is stopped by the cell drop operation according to Example 1 with no supply of electric power to the DC link capacitor. Referring to FIGS. 1 to 10, only the parts that are changed from Example 1 are shown below.

For example, in the case in which the converter 107 shown in FIG. 1 is to be stopped, the inverter 110 is used as a rectifier to charge the DC link capacitor 113 from the power converter cell 105. The power converter cell that can be used as a rectifier is a given cell. According to the example, the down time of the converter that has been stopped by the cell drop operation can be prolonged.

After the DC link voltage of the power converter cell whose converter has been stopped by the cell drop operation is less than a predetermined voltage, the central controller 204 shown in FIG. 2 controls the inverter in the power converter cell whose converter has been stopped as a rectifier unit. When viewed from the other power converter cells in rectification, another load is connected in series to the load. Therefore, since the load voltage is dropped, the output voltage command values of the power converter cells whose converter is operating have to be increased. For example, in the case in which N power converter cells are in normal operation, a method is considered with which a drop in the voltage is divided by N and the divided N drops are allocated to N cells to increase the voltage command value.

Figure 9:
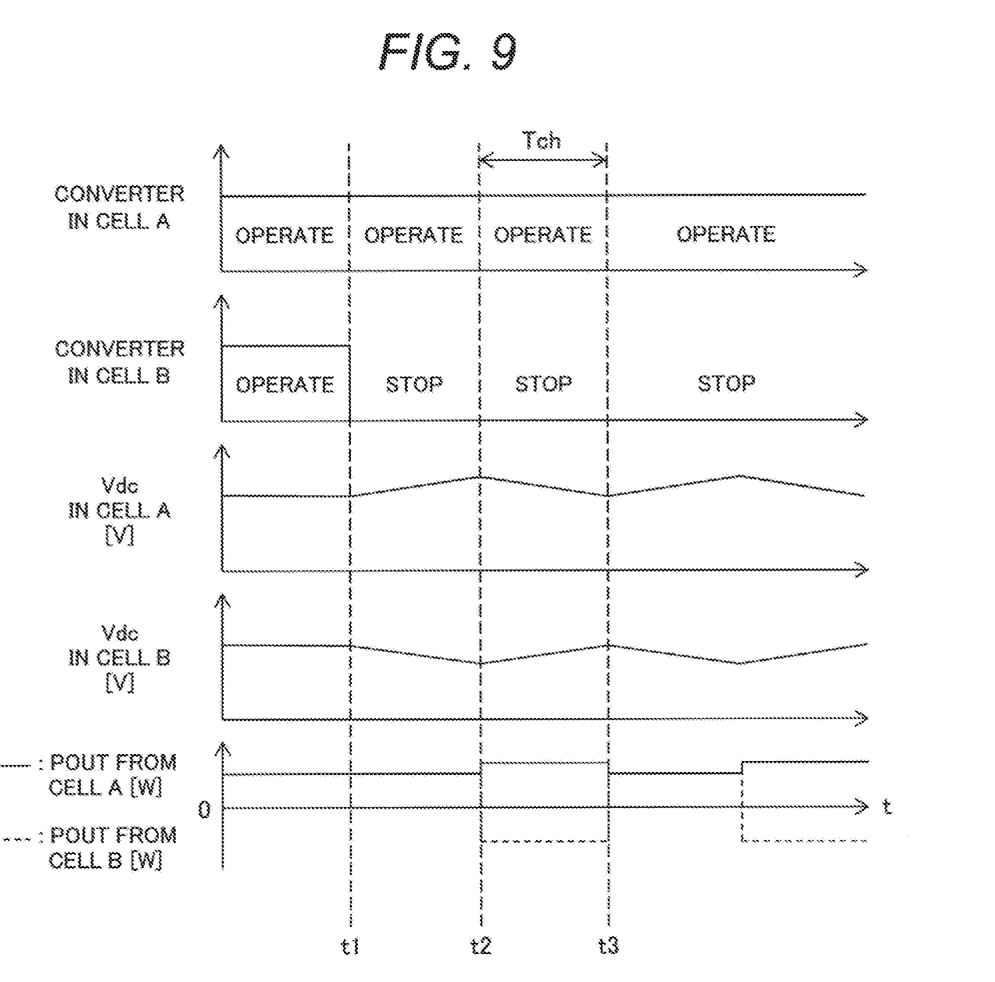
FIG. 9 is a diagram showing an example of the transition of operation status in the case of the configuration of Example 3.

FIG. 9 is a diagram showing an example of the transition of operation status in the case in which about a half of N power converter cells are to be stopped in the case in which the present invention is adapted.

Similarly in FIG. 7, the cell drop operation begins at time t1. Although the DC link voltage of the power converter cells in group B is less than a predetermined voltage at time t2, the converter is not operated. The output electric power of the power converter cells in the group B is negative in a period Tch from time t2 to t3. In the mode in the period Tch, the inverters in the group B operate as a rectifier, and the power converter cells in group A charge the DC link capacitors in group B. Thus, the output electric power of the power converter cells in group A is increased in the period Tch. A method is considered with which for the increase in output electric power, necessary electric power is equally allocated to the number of the cells in the group A, for example, for determination.

Figure 10:
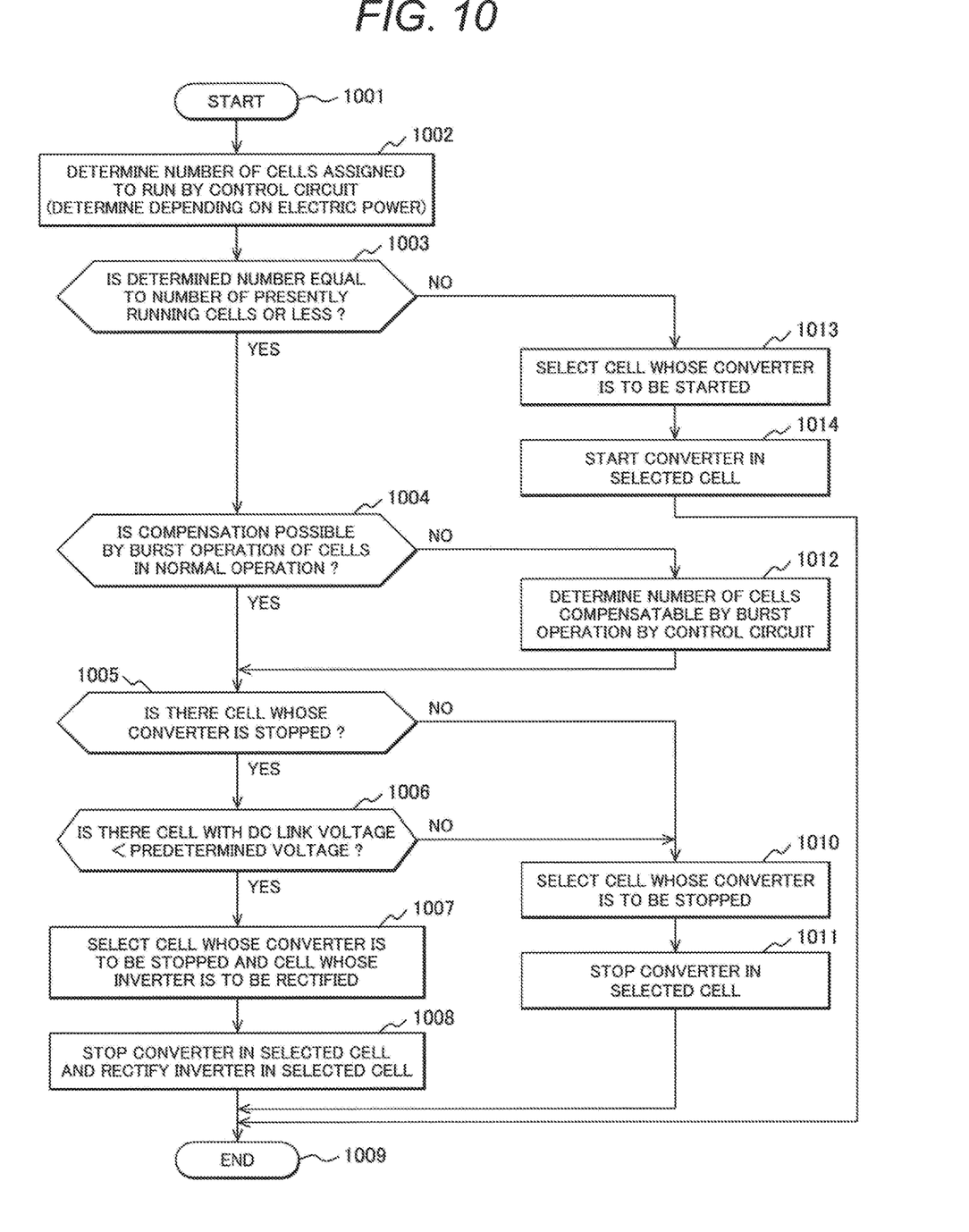
FIG. 10 is a flowchart showing an embodiment of the detailed process procedures of the cell drop operation in the case of the configuration of Example 3.

FIG. 10 is a flowchart showing the process procedures in the case in which the example is adapted. Steps 1001 to 1003, Steps 1010 and 1011, and Steps 1013 and 1014 are respectively overlapped with Steps 401 to 403, Steps 409 and 410, and Steps 411 and 412 described in FIG. 4, and the description is omitted.

When the determination is YES in Step 1003, the central controller 204 determines whether the DC link voltage of the power converter cells whose the converter is stopped can be compensated by the other power converter cells based on the number of power converter cells in normal operation and the load voltage (Step 1004).

When the determination is YES in Step 1004, the central controller 204 determines the presence or absence of a power converter cell whose converter is stopped, whereas when the determination is NO, the central controller 204 performs the process in Step 1010 (Step 1005).

When the determination is YES in Step 1005, the central controller 204 determines the presence or absence of a power converter cell having the DC link voltage that is less than a predetermined voltage, whereas when the determination is NO, the central controller 204 performs the process in Step 1010 (Step 1006).

When the determination is YES in Step 1006, the central controller 204 selects a power converter cell whose converter is to be stopped and a power converter cell whose inverter is to operate as a rectifier based on the DC link voltage (Step 1007).

Subsequently, the central controller 204 stops the converter in the selected power converter cell, and operates the inverter as a rectifier in the selected power converter (Step 1008).

Until the procedures up to Step 1008, the series of processes is ended (Step 1009).

When the determination is NO in Step 1004, the central controller 204 again determines whether the number of cells that can compensate the voltage by the burst operation of the power converter cells in normal operation, and performs the process in Step 1005 (Step 1012).

REFERENCE SIGNS LIST

100 . . . power conversion device
101 . . . power supply
102 . . . load
103 . . . central controller
104 to 106 . . . power converter cell
107 to 109 . . . converter
110 to 112 . . . inverter
113 to 115 . . . DC link capacitor
116 . . . communication line

The invention claimed is:

1. A power conversion device comprising:
a plurality of power converter cells; and
a controller configured to control the plurality of power converter cells,
wherein the plurality of power converter cells has outputs connected in series, each of the plurality of power converter cells has a converter configured to convert a voltage outputted from a power supply connected to inputs of the plurality of power converter cells and generate a DC link voltage, and an inverter configured to convert the DC link voltage into an alternating current voltage and output the alternating current voltage to a load connected to the outputs of the plurality of power converter cells,
the controller stops a converter in a given power converter cell of the plurality of power converter cells depending on power supply electric power outputted from the power supply or load electric power of the load, and
wherein with a drop in the DC link voltage of a power converter cell whose converter is stopped, a DC link voltage of a power converter cell whose converter is operating is increased.

2. The power conversion device according to claim 1,
wherein the controller compares the power supply electric power or the load electric power with a predetermined electric power value, and
when the power supply electric power or the load electric power is smaller than the predetermined electric power value, the controller stops a converter in a given power converter cell in the power converter cells.

3. The power conversion device according to claim 1,
wherein to an inverter in the power converter cell having the converter which was stopped, electric power is supplied from a DC link capacitor provided in a DC link unit connected to the converter which was stopped and the inverter in the power converter cell having the converter which was stopped, and the inverter in the power convert cell having the converter which was stopped operates to obtain desired load electric power.

4. The power conversion device according to claim 1,
wherein when the DC link voltage of the power converter cell having the converter stopped is dropped to less than a predetermined voltage, the converter charges a DC link capacitor such that the DC link voltage is the predetermined voltage or more.

5. The power conversion device according to claim 4,
wherein in charging the DC link capacitor, the converter operates so as to achieve maximum efficiency.

6. The power conversion device according to claim 1,
wherein the controller determines a number of the converters assigned to run or a number of the converters to be stopped such that the power conversion device is to achieve maximum efficiency based on the power supply electric power or a load factor of the load, a number of the plurality of power converter cells, and electric power conversion efficiency of the plurality of power converter cells.

7. The power conversion device according to claim 6,
wherein a converter is stopped in priority in a power converter cell having the detected DC link voltage that is higher than a predetermined voltage and having a detected temperature that is low.

8. The power conversion device according to claim 1,
wherein when the DC link voltage of the power converter cell having the converter that was stopped is dropped to less than a predetermined voltage, a DC link capacitor is charged by an inverter in a power converter cell whose converter is operating such that the DC link voltage of the power converter cell having the stopped converter is the predetermined voltage or more.

9. A power conversion device comprising:
a plurality of power converter cells; and
a controller configured to control the plurality of power converter cells,
wherein the plurality of power converter cells has outputs connected in series,
each of the plurality of power converter cells has a converter configured to convert a voltage outputted from a power supply connected to inputs of the plurality of power converter cells and generate a DC link voltage, and an inverter configured to convert the DC link voltage into an alternating current voltage and output the alternating current voltage to a load connected to the outputs of the plurality of power converter cells, the controller stops a converter in a given power converter cell of the plurality of power converter cells depending on power supply electric power outputted from the power supply or load electric power of the load, wherein the controller includes a detecting unit configured to detect the DC link voltages and temperatures of the power converter cells, and the controller selects the power converter cell having the converter that is to be stopped based on the detected DC link voltages and the detected temperatures.

10. A power conversion system comprising:

a power supply;

a plurality of power converter cells connected to the power supply; and a controller configured to control the plurality of power converter cells, wherein the plurality of power converter cells has outputs connected in series, each of the plurality of the plurality of power converter cells has a converter configured to convert a voltage outputted from the power supply and generate a DC link voltage, and an inverter configured to convert the DC link voltage into an alternating current voltage and output the alternating current voltage to a load connected to the outputs of the plurality of power converter cells, the controller stops the converter in a given cell in the plurality of power converter cells depending on power supply electric power outputted from the power supply or load electric power of the load, wherein the controller includes a detecting unit configured to detect the DC link voltages and temperatures of the power converter cells, and the controller selects the power converter cell having the converter that is to be stopped based on the detected DC link voltages and the detected temperatures.

11. The power converter system according to claim 10, wherein the power supply is a solar panel.

* * * * *